United States Patent
Tochikubo et al.

(10) Patent No.: US 11,551,715 B2
(45) Date of Patent: Jan. 10, 2023

(54) CARTRIDGE MEMORY AND CONTROL METHOD FOR THE SAME, CARTRIDGE, AND RECORDING AND REPRODUCING SYSTEM

(71) Applicant: Sony Corporation, Tokyo (JP)

(72) Inventors: Shinya Tochikubo, Miyagi (JP); Takanobu Iwama, Miyagi (JP); Eiji Nakashio, Miyagi (JP); Kazuo Anno, Miyagi (JP); Naohiro Adachi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/957,290

(22) PCT Filed: Oct. 21, 2019

(86) PCT No.: PCT/JP2019/041374
§ 371 (c)(1),
(2) Date: Jun. 23, 2020

(87) PCT Pub. No.: WO2020/085325
PCT Pub. Date: Apr. 30, 2020

(65) Prior Publication Data
US 2021/0366514 A1 Nov. 25, 2021

(30) Foreign Application Priority Data
Oct. 24, 2018 (JP) .............................. JP2018-200365

(51) Int. Cl.
*G11B 5/78* (2006.01)
*H01Q 7/00* (2006.01)

(52) U.S. Cl.
CPC ................. *G11B 5/78* (2013.01); *H01Q 7/00* (2013.01)

(58) Field of Classification Search
CPC ......... G11B 5/78; G11B 15/68; G11B 23/107; G11B 23/30; G11B 25/06; H01Q 7/00; G06K 19/07; H04B 5/02
See application file for complete search history.

(56) References Cited

U.S. PATENT DOCUMENTS 7,227,721 B1 * 6/2007 Kientz ................. G11B 23/042
7,859,474 B1 * 12/2010 Cripe ..................... H03H 11/30
330/297

(Continued)

FOREIGN PATENT DOCUMENTS

| JP | 2002-150742 | 5/2002 |
| JP | 2002-150742 A | 5/2002 |

(Continued)

OTHER PUBLICATIONS

Machine English translation of JP2002-150742; "Information Storage Cartridge, Information Recording/Reproducing Device and Information Recording/Reproducing System"; Kurokawa Toshiya et al; 57 pages. (Year: 2002).*

(Continued)

*Primary Examiner* — Brian E Miller
(74) *Attorney, Agent, or Firm* — K&L Gates LLP

(57) ABSTRACT

A cartridge memory is a cartridge memory used in a recording medium cartridge and includes an antenna section that induces an induced voltage by means of electromagnetic induction, a load modulation section including a load whose magnitude is variable, and a control section that measures the induced voltage and controls the load modulation section on the basis of the measured induced voltage.

8 Claims, 6 Drawing Sheets

(56) References Cited

U.S. PATENT DOCUMENTS

| | | | | |
|---|---|---|---|---|
| 8,436,718 | B2* | 5/2013 | Goto | G06K 7/10158 340/10.4 |
| 8,471,685 | B2* | 6/2013 | Shingai | G06K 19/0701 340/10.6 |
| 8,773,244 | B2* | 7/2014 | Onozuka | G06K 7/0008 340/10.2 |
| 9,042,816 | B2* | 5/2015 | Frankland | H04B 5/0056 455/41.1 |
| 9,071,289 | B2* | 6/2015 | McFarthing | H04B 5/0075 |
| 9,991,937 | B2* | 6/2018 | Kim | H04B 5/0081 |
| 10,164,600 | B2* | 12/2018 | Kormann | G06K 7/10148 |
| 2004/0141790 | A1* | 7/2004 | Waters | G06K 19/07718 400/611 |
| 2009/0224058 | A1* | 9/2009 | Savry | G06K 19/07749 235/492 |
| 2009/0273454 | A1* | 11/2009 | Onozuka | G06K 7/0008 340/10.51 |
| 2009/0284352 | A1* | 11/2009 | Witschnig | G06K 19/0723 340/10.1 |
| 2010/0231461 | A1* | 9/2010 | Tran | H01Q 1/085 343/702 |
| 2012/0235508 | A1* | 9/2012 | Ichikawa | H04B 5/0087 307/104 |
| 2013/0027078 | A1* | 1/2013 | Nakano | H02J 50/60 324/633 |
| 2013/0063160 | A1* | 3/2013 | Nakano | G01R 31/72 324/653 |
| 2014/0125287 | A1* | 5/2014 | Nakano | H01F 38/14 307/104 |
| 2016/0285311 | A1* | 9/2016 | Masumoto | H02J 50/10 |
| 2016/0351556 | A1* | 12/2016 | Nakaiso | H01L 27/0248 |
| 2019/0090957 | A1* | 3/2019 | De Wijs | A61B 34/20 |
| 2021/0012804 | A1* | 1/2021 | Nakashio | G06K 19/077 |
| 2021/0233567 | A1* | 7/2021 | Tochikubo | G06K 19/0723 |
| 2021/0249044 | A1* | 8/2021 | Nakashio | G11B 15/43 |
| 2021/0366514 | A1* | 11/2021 | Tochikubo | G11B 5/78 |
| 2021/0383836 | A1* | 12/2021 | Anno | G11B 5/00813 |

FOREIGN PATENT DOCUMENTS

| | | |
|---|---|---|
| JP | 2002-189994 | 7/2002 |
| JP | 2002-189994 A | 7/2002 |
| JP | 2003-109353 | 4/2003 |
| JP | 2003-109353 A | 4/2003 |
| JP | 2006-238398 | 7/2006 |
| JP | 2006-238398 A | 9/2006 |
| JP | 2007-242218 | 9/2007 |
| JP | 2007-242218 A | 9/2007 |
| JP | 2008-199536 | 8/2008 |
| JP | 2008-199536 A | 8/2008 |
| JP | 2009-272697 | 11/2009 |
| JP | 2009-272697 A | 11/2009 |
| JP | 2014-102863 | 6/2014 |
| JP | 2014-102863 A | 6/2014 |

OTHER PUBLICATIONS

International Search Report issued in connection with PCT/JP2019/041374 dated Dec. 10, 2019. (2 pages).

* cited by examiner

CARTRIDGE MEMORY AND CONTROL METHOD FOR THE SAME, CARTRIDGE, AND RECORDING AND REPRODUCING SYSTEM

TECHNICAL FIELD

The present disclosure relates to a cartridge memory and a control method therefor, a cartridge, and a recording and reproducing system.

BACKGROUND ART

Magnetic recording media have been widely utilized for the purpose of storing electronic data. In particular, magnetic tapes, whose cost per unit of data capacity is low, are attracting attention again and are being leveraged as recording media used in cloud storage services, together with HDDs (Hard Disk Drives), in data centers, etc.

For such magnetic tapes, magnetic tapes conforming to a Linear Tape Open (LTO) Ultrium standard are in widespread use. Tape cartridges conforming to the LTO Ultrium standard incorporate a noncontact type nonvolatile memory called a cartridge memory (CM) and implementing an RF wireless communication function (see, for example, PTL 1). Such a cartridge memory includes data written therein, such as manufacturing information, a drive usage history, vendor-specific management information, etc. Reading the above data from the cartridge memory by a drive after loading of a cartridge into the drive makes it possible to check a usage status of the cartridge, etc. in a fraction of time.

CITATION LIST

Patent Literature

[PTL 1]
Japanese Patent Laid-open No. 2003-109353

SUMMARY

Technical Problem

Shapes of antennas included in recording and reproducing apparatuses such as drives unfortunately differ for each of manufacturers. Further, positions of the antennas relative to cartridge memories also differ for each of the manufactures of the recording and reproducing apparatuses. For these reasons, specific ones of the recording and reproducing apparatuses are likely to be incapable of making stable communication because of occurrence of a null point or a decrease of electric power consumption therefor.

An object of the present disclosure is to provide a cartridge memory and a control method therefor that are capable of making stable communication, a cartridge, and a recording and reproducing system.

Solution to Problem

In order to solve the above problem, a first disclosure discloses a cartridge memory used in a recording medium cartridge, the cartridge memory including an antenna section that induces an induced voltage by means of electromagnetic induction, a load modulation section including a load whose magnitude is variable, and a control section that measures the induced voltage and controls the load modulation section on the basis of the measured induced voltage.

A second disclosure discloses a recording medium cartridge including the cartridge memory according to the first disclosure.

A third disclosure discloses a recording and reproducing system that includes a recording medium cartridge including the cartridge memory according to the first disclosure, and that includes a recording and reproducing apparatus that performs recording and reproducing into and from the recording medium cartridge.

A fourth disclosure discloses a control method for a cartridge memory used in a recording medium cartridge, the control method including measuring an induced voltage induced on an antenna coil, and controlling load modulation on the basis of the measured induced voltage.

DESCRIPTION OF EMBODIMENTS

Embodiments of the present disclosure will be described in the following order.
1. First Embodiment (Examples of Recording and Reproducing System, Cartridge, and Cartridge Memory)
2. Second Embodiment (Example of Cartridge Memory)

1. First Embodiment

[Configuration of Recording and Reproducing System]

Figure 1:
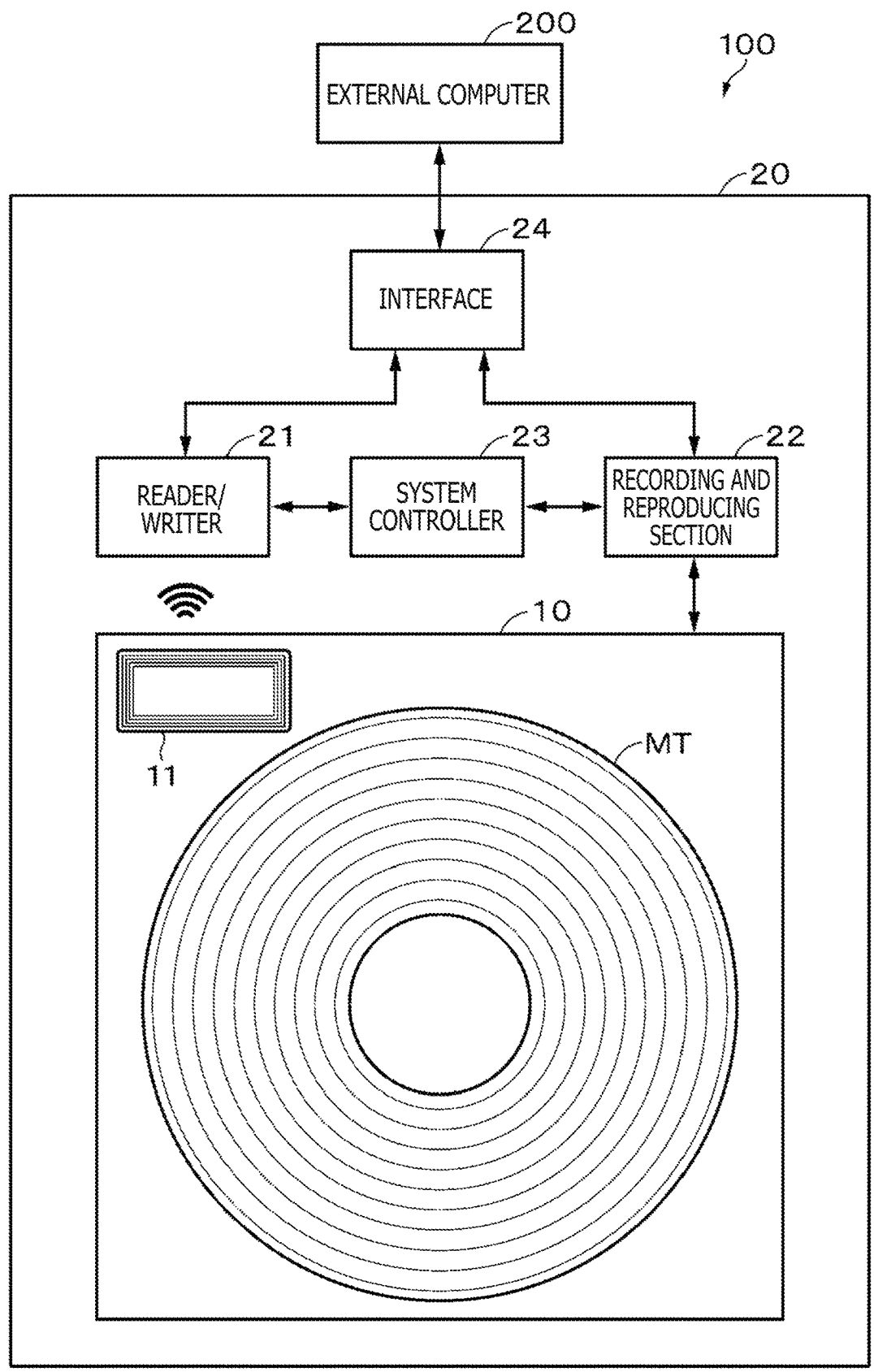
FIG. 1 is a schematic diagram illustrating an example of a configuration of a recording and reproducing system according to a first embodiment of the present disclosure.

FIG. 1 illustrates an example of a configuration of a recording and reproducing system 100 according to this first embodiment of the present disclosure. The recording and reproducing system 100 is a magnetic tape recording and reproducing system, and includes a cartridge 10 including a magnetic tape MT and a cartridge memory 11, and a recording and reproducing apparatus 20 configured to be capable of loading and unloading the cartridge 10.

[Configuration of Recording and Reproducing Apparatus]

The recording and reproducing apparatus 20 is what is called a magnetic tape drive, and includes a reader/writer 21 serving as a communication section, a recording and reproducing section 22, a system controller 23 serving as a control section, and an interface 24. The recording and reproducing apparatus 20 is connected to an external computer 200 via the interface 24.

The reader/writer 21 communicates with the cartridge memory 11 in accordance with a prescribed wireless communication standard. Here, the prescribed communication standard is, for example, a communication standard that is prescribed for the cartridge memory 11 in accordance with an LTO (Linear Tape-Open) standard (the above communication standard being hereinafter referred to as an "LTO stipulation-based communication standard").

The LTO standard-based communication standard is a near-field wireless communication standard having been customized for LTO on the basis of Type A scheme (NXP) of ISO 14443-2. Here, the LTO standard may be any one of LTO standards, namely, LTO-1 to LTO-8, and alternatively may be any one of LTO standards expected to be formulated hereafter, namely, LTO-9 and beyond.

The recording and reproducing section 22 includes a motor (not illustrated) for allowing the magnetic tape MT to run, a head unit (not illustrated), etc., and performs recording/reproducing of data into/from the magnetic tape MT.

The system controller 23 controls individual sections of the recording and reproducing apparatus 20, such as the reader/writer 21 and the recording and reproducing section 22. The system controller 23 includes a CPU (Central Processing Unit), a ROM (Read Only Memory), a RAM (Random Access Memory), etc., which are not illustrated.

The interface 24 is connected to the recording and reproducing section 22 and the external computer 200. A signal having been read from the magnetic tape MT by the recording and reproducing section 22 is output to the external computer 200 via the interface 24 whereas a signal to be recorded into the magnetic tape MT by the recording and reproducing section 22 is supplied from the external computer 200 via the interface 24.

The interface 24 may be connected to the reader/writer 21. In this case, a configuration can be made in which control of the reader/writer 21 is performed by operation inputs from the external computer 200 connected to the interface 24.

[Structure of Cartridge]

Figure 2:
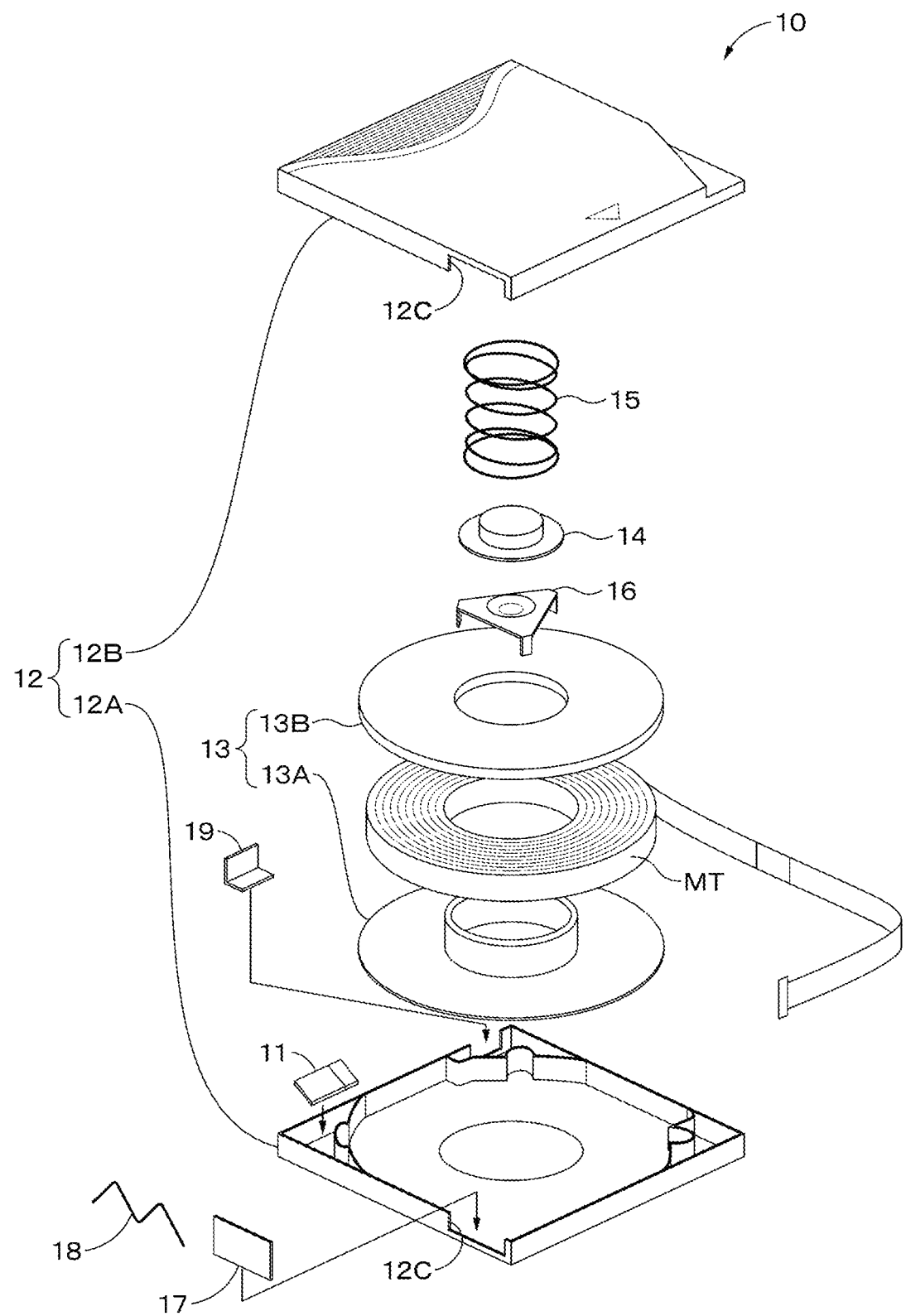
FIG. 2 is a perspective, exploded view of a cartridge, illustrating an example of a structure of the cartridge.

FIG. 2 illustrates an example of a structure of the cartridge 10. The cartridge 10 is a magnetic tape cartridge (a recording medium cartridge) conforming to the LTO standard, and includes, inside a cartridge case 12 including a lower shell 12A and an upper shell 12B, a reel 13 around which the magnetic tape MT is wound, a reel lock 14 and a reel spring 15 for locking rotation of the reel 13, a spider 16 for releasing the locked state of the reel 13, a slide door 17 for opening/closing a tape drawing port 12C defined in the cartridge case 12 across the lower shell 12A and the upper shell 12B, a door spring 18 for biasing the slide door 17 toward a closed position of the tape drawing port 12C, a write protect 19 for protecting from erroneous erasure, and the cartridge memory 11. The reel 13 has a substantially disk-like shape having an opening at its central portion, and has a reel hub 13A and a flange 13B each including a rigid material such as plastic.

The cartridge memory 11 is disposed in the vicinity of one corner of the cartridge 10. The cartridge memory 11 is disposed so as to face the reader/writer 21 of the recording and reproducing apparatus 20 in a state in which the cartridge 10 is loaded in the recording and reproducing apparatus 20. The cartridge memory 11 communicates, in accordance with the prescribed wireless communication standard, with the reader/writer 21, that is, with the recording and reproducing apparatus 20, as described above.

[Structure of Magnetic Tape]

Figure 3:
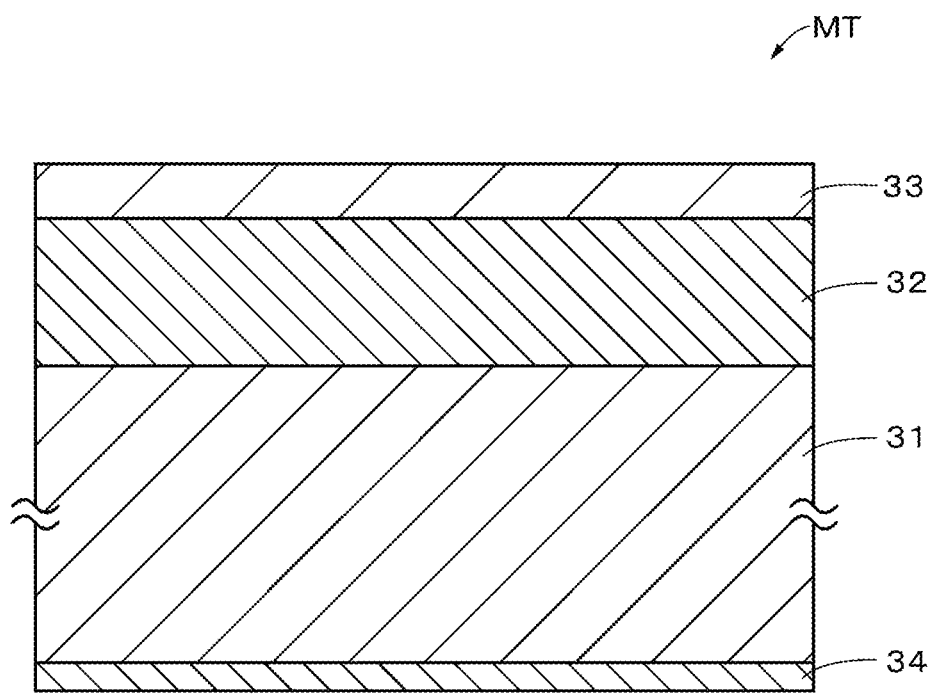
FIG. 3 is a cross-sectional view of a magnetic tape, illustrating an example of a structure of the magnetic tape.

FIG. 3 illustrates an example of a structure of the magnetic tape MT. The magnetic tape MT is what is called a coating type magnetic tape, and includes a long-shaped base body 31, an underlayer 32 disposed on one main face of the base body 31, and a magnetic layer 33 disposed on the underlayer 32. Here, the underlayer 32 is a layer that is provided as necessary, and thus may not be disposed. The magnetic tape MT may further include a back coat layer 34 disposed on the other main face of the base body 31 as necessary.

(Base Body)

The base body 31, which serves as a supporting body, is a long-shaped nonmagnetic base body having flexibility. The nonmagnetic base body is a film, and a thickness of this film is, for example, larger than or equal to 3 μm and smaller than or equal to 8 μm. Examples of a material usable as the base body 31 include a polyester type material such as polyethylene terephthalate or polyethylene naphthalate; a polyolefin type material such as polyethylene or polypropylene; a cellulose derivative such as cellulose triacetate, cellulose diacetate, or cellulose butyrate; a vinyl-based resin such as polyvinyl chloride or polyvinylidene chloride; plastic such as polycarbonate, polyamide, polyimide, or polyamidimide; light metal such as an aluminum alloy or a titanium alloy; a ceramic material such as alumina glass; and so on.

(Magnetic Layer)

The magnetic layer 33 is a record layer for recording signals. The magnetic layer 33 preferably has magnetic anisotropy in a vertical direction. That is, an easy magnetization axis of the magnetic layer 33 is preferably directed in the vertical direction. The magnetic layer 33 preferably includes, in advance, a plurality of servo bands and a plurality of data bands. The plural servo bands are disposed at equal intervals in a width direction of the magnetic tape MT. A data band is disposed between adjacent servo bands. Servo signals for performing tracking control of a magnetic head are written in the servo bands in advance. User data is recorded in the data bands.

The magnetic layer 33 includes, for example, magnetic powder and a binding agent. The magnetic layer 33 may further include at least one of additive agents such as a lubricant agent, conductive particles, an abrasive agent, or a rust-preventive agent as necessary.

The magnetic powder is preferably aligned in a thickness direction (the vertical direction) of the magnetic tape MT. The magnetic powder includes, for example, ε-iron oxide particles, Co-containing spinel ferrite particles or hexagonal ferrite particles (for example, barium ferrite particles), and so on.

As the binding agent, a resin having a structure obtained by applying a crosslinking reaction to a polyurethane-based resin, a vinyl chloride-based resin, or the like, is preferable. The binding agent, however, is not limited to these resins, and a different resin may be appropriately compounded in accordance with physical properties required of the magnetic tape MT. The compounded resin is, typically, not particularly restricted if it is any resin commonly used in the coating type magnetic tape.

For example, at least one of the following can be used: polyvinyl chloride; polyvinyl acetate; a vinyl chloride-vinyl acetate copolymer; a vinyl chloride-vinylidene chloride copolymer; a vinyl chloride-acrylonitrile copolymer; an acrylic ester-acrylonitrile copolymer; an acrylic ester-vinyl chloride-vinylidene chloride copolymer; a vinyl chloride-acrylonitrile copolymer: an acrylic ester-acrylonitrile copolymer: an acrylic ester-vinylidene chloride copolymer; a methacrylic ester-vinylidene chloride copolymer; a methacrylic ester-vinyl chloride copolymer; a methacrylic ester-ethylene copolymer; polyvinyl fluoride; a vinylidene chloride-acrylonitrile copolymer; an acrylonitrile-butadiene copolymer; a polyamide resin; polyvinyl butyral; a cellulose derivative (cellulose acetate butyrate, cellulose diacetate, cellulose triacetate, cellulose propionate, nitrocellulose); a styrene butadiene copolymer; a polyester resin; an amino resin; synthetic rubber; and so on.

An average thickness of the magnetic layer 33 is preferably larger than or equal to 30 nm and smaller than or equal to 120 nm, and is more preferably larger than or equal to 50 nm and smaller than or equal to 70 nm. The average thickness of the magnetic layer 33 is obtained by measuring the thickness of the magnetic layer 33 from a cross-section TEM (Transmission Electron Microscope) image at at least more than or equal to ten positions in a longitudinal direction of the magnetic tape MT, and thereafter simply averaging (arithmetically averaging) measurement values resulting from the measurements.

(Underlayer)

The underlayer 32 is a layer for absorbing unevenness of a surface of the base body 31 and adjusting unevenness of a surface of the magnetic layer 33. The underlayer 32 is a nonmagnetic layer including nonmagnetic powder and a binding agent. The underlayer 32 may further include at least one of additive agents such as a lubricant agent, an antistatic agent, a curing agent, or a rust-preventive agent as necessary.

The nonmagnetic powder may be an inorganic substance or an organic substance. Further, the nonmagnetic powder may be carbon black or the like. As the inorganic substance, at least one of, for example, metal, metal oxide, metal carbonate, metal sulfate, metal nitride, metal carbide, or metal sulfide can be used. Examples of a shape of the nonmagnetic powder include various shapes such as a needle-like shape, a spherical shape, a cubic shape, or a plate shape, but are not limited to these shapes. The binding agent is similar to that of the aforementioned magnetic layer 33.

An average thickness of the underlayer 32 is preferably larger than or equal to 0.5 μm and smaller than or equal to 2.0 μm, and is more preferably larger than or equal to 0.6 μm and smaller than or equal to 1.4 μm. The average thickness of the underlayer 32 is obtained in a way similar to that of the average thickness of the magnetic layer 33.

[Configuration of Cartridge Memory]

Figure 4:
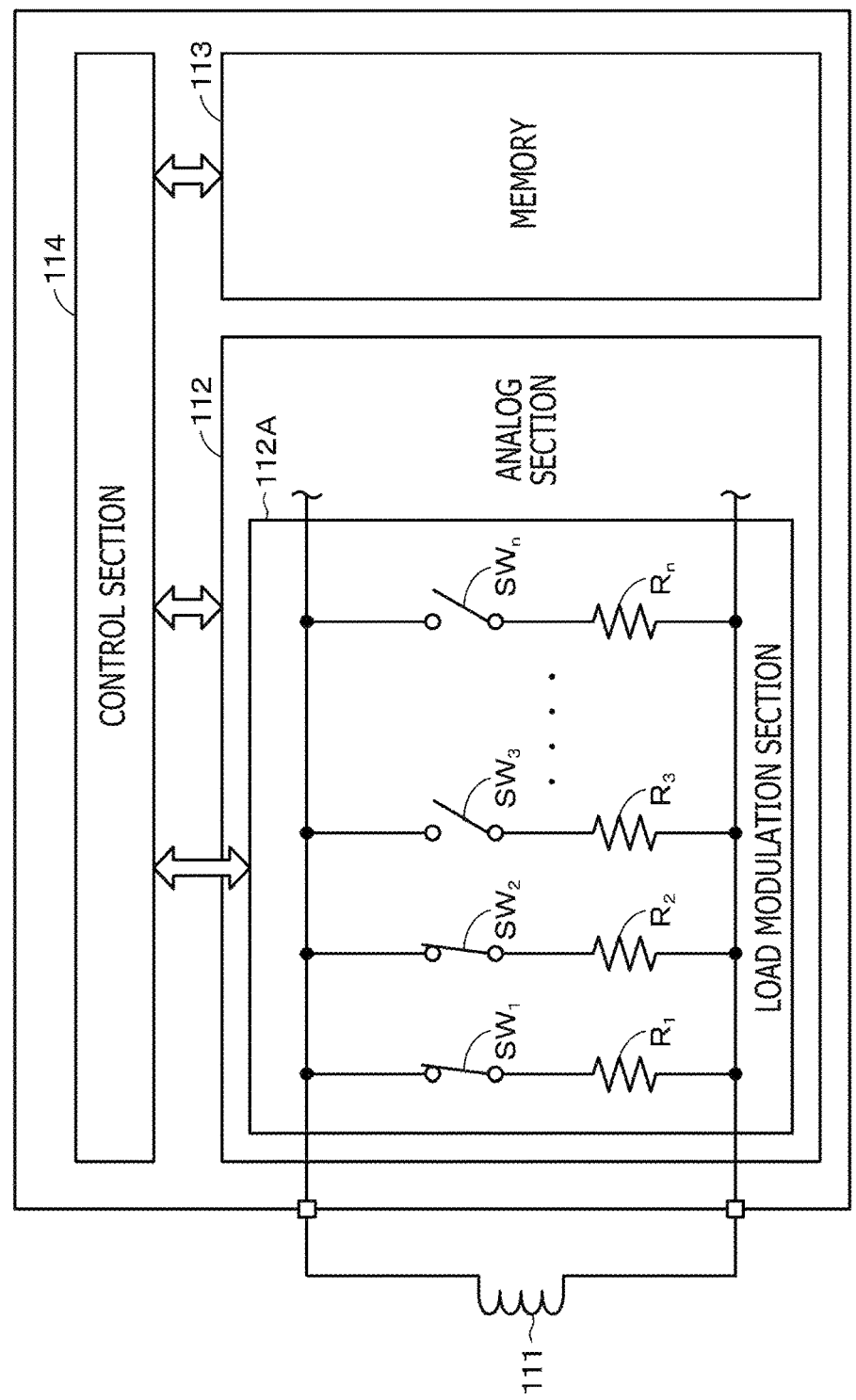
FIG. 4 is a block diagram illustrating an example of a configuration of a cartridge memory.

FIG. 4 illustrates an example of a configuration of the cartridge memory 11 used in the cartridge 10. The cartridge memory 11 includes an antenna coil (an antenna section) 111, an analog section 112, a memory (a storage section) 113, and a control section 114.

The antenna coil 111 induces an induced voltage by means of electromagnetic induction. Further, the antenna coil 111 transmits/receives data to/from the reader/writer 21 in a noncontact manner through radio waves. Specifically, the antenna coil 111 receives radio waves having been transmitted from the reader/writer 21, and supplies received signals to the analog section 112. Further, the antenna coil 111 transmits signals having been supplied from the analog section 112 (namely, signals having been load-modulated in the analog section 112) to the reader/writer 21.

The analog section 112 performs processes such as detection, modulation and demodulation, and clock extraction on signals transmitted/received from the antenna section 101. The analog section 112 includes a load modulation section 112A including a load whose magnitude is variable. The load modulation section 112A is connected in parallel to the antenna coil 111. The load modulation section 112A includes a resistance variable section, implementing resistance as the load, for performing resistance load modulation on transmitting signals.

The load modulation section 112A includes a plurality of resistors $R_1$ to $R_n$ connected in parallel, and a plurality of switches $SW_1$ to $SW_n$ each connected in series with a corresponding one of the plurality of resistors $R_1$ to $R_n$. The switches $SW_1$ to $SW_n$ are each a semiconductor switch implementing, for example, a field-effect transistor to which a metal-oxide semiconductor is applied (namely, a MOSFET), or the like, and are controlled by the control section 114. A magnitude of the load (a magnitude of combined resistance) of the load modulation section 112A is adjusted by means of the number of turned on-and-off switches among the switches $SW_1$ to $SW_n$.

The analog section 112 includes a rectification circuit (not illustrated). The rectification circuit is a circuit for converting an alternating-current induced voltage having arisen on the antenna coil 111 into a direct-current induced voltage. The direct-current induced voltage output from the rectification circuit is used as an electric power voltage for operations of individual sections provided inside the cartridge memory 11.

The memory 113 is a storage section for storing data associated with the cartridge 10, etc. The memory 113 is a non-volatile memory (NVM). As the non-volatile memory, an EEPROM (Electrically Erasable Programmable Read-Only Memory) is typically used, and alternatively, an MRAM (Magnetoresistive Random Access Memory), a ReRAM (Resistive Random Access Memory), or the like may be used.

The control section 114 communicates with the recording and reproducing apparatus 20 via the antenna coil 111. Specifically, the control section 114 performs, for example, mutual authentication, transmission/reception of commands, exchange of data, etc. The control section 114 controls the on/off of each of the switches $SW_1$ to $SW_n$ to adjust the magnitude of the load of the load modulation section 112A. The larger the number of turned off switches among the switches $SW_1$ to $SW_n$ is, the larger the load is. In a default state (initial-setting state) before initial driving control of the switches $SW_1$ to $SW_n$ is performed after the loading of the cartridge 10 into the recording and reproducing apparatus 20, all of the switches $SW_1$ to $SW_n$ may be in an on-state, and alternatively, a predetermined number of switches $SW_1$ to $SW_m$ (m being a positive integer smaller than n), for example, a half number of switches $SW_1$ to $SW_{n/2}$, among the switches $SW_1$ to $SW_n$ may be in the on-state.

The control section 114 measures the direct-current induced voltage having been converted by the rectification circuit, and controls the load modulation section 112A on the basis of the magnitude of a voltage value thereof. Specifically, the smaller the measured voltage value is, the larger the control section 114 makes the number of switches to be turned off among the switches $SW_1$ to $SW_n$ to make the load larger.

When electric current flowing through the load modulation section 112A is denoted by I and the combined resistance of the load modulation section 112A is denoted by R, electric power P consumed in the load modulation section 112A is represented as $P=RI^2$. Further, when the induced voltage induced on the antenna coil 111 is denoted by V, the electric current I flowing through the load modulation section 112A is represented as $I=V/R$. Thus, the electric power P consumed in the load modulation section 112A is represented as $P=V^2/R$. It can be understood from this formula that the larger the load (the combined resistance) of the load modulation section 112A is made by increasing the number of the turned off switches among the switches $SW_1$ to $SW_n$, the smaller the electric power consumption of the load modulation section 112A is made.

The control section 114 has a plurality of threshold voltages $V_1$ to $V_n$, and controls the number of the turned on-and-off switches among the switches $SW_1$ to $SW_n$ on the basis of the threshold voltages $V_1$ to $V_n$ such that the electric power consumption in the load modulation section 112A is reduced and a decrease of intensity of communication due to a null point is suppressed. Further, a configuration may be employed in which the memory 113 stores therein a table in which ranges of the voltage value are associated with the numbers of the turned off switches among the switches $SW_1$ to $SW_n$ and the control section 114 controls the turned on-and-off switches among the switches $SW_1$ to $SW_n$ on the basis of the table such that the electric power consumption in the load modulation section 112A is reduced and the decrease of the intensity of the communication due to the null point is suppressed.

[State Transition of Cartridge Memory]

Figure 5:
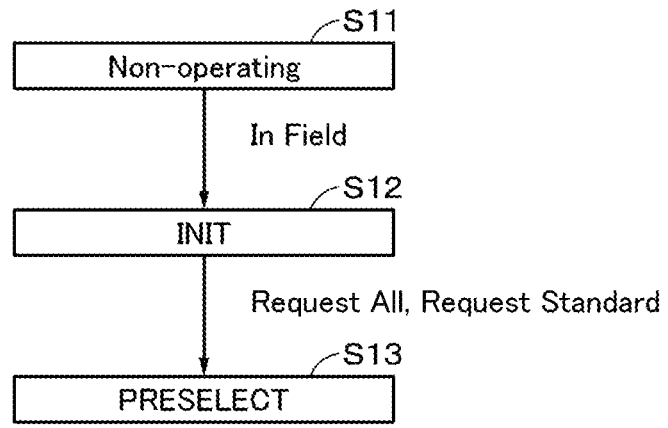
FIG. 5 is a flowchart for describing an example of state transition of the cartridge memory.

Hereinafter, an example of state transition of the cartridge memory 11 will be described with reference to FIG. 5.

At step S11, the cartridge memory 11, namely, the control section 114, is in a non-operating state. At step S12, upon receipt, by the antenna coil 111, of an alternating-current magnetic field radiated from the recording and reproducing apparatus 20, which is communication target equipment, the control section 114 starts up and enters a standby state (INIT state). In this state, in a case in which the control section 114 receives a Request All command or a Request Standard command from the recording and reproducing apparatus 20 via the antenna coil 111, the control section 114 transits into a PRESELECT state at step S13. Here, the PRESELECT state is a state in which the communication is available between the cartridge memory 11 and the recording and reproducing apparatus 20. The Request All command and the Request Standard command are commands for execution of poling operation for detecting whether or not the recording and reproducing apparatus 20 conforming to the LTO standard exists.

[Operation of Load Modulation]

Figure 6:
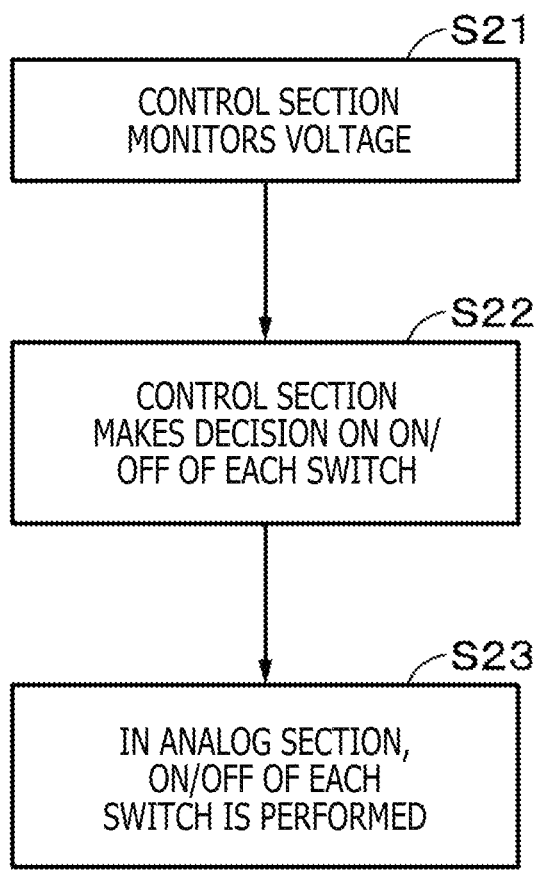
FIG. 6 is a flowchart for describing an example of a control operation for load modulation of the cartridge memory.

Hereinafter, an example of control operation for the load modulation of the cartridge memory 11 will be described with reference to FIG. 6. This control operation for the load operation is performed in a standby state (INIT state) at step S12 or in a PRESELECT state at step S13, these states being illustrated in FIG. 5.

First, at step S21, the control section 114 measures the direct-current induced voltage having been rectified by the rectification circuit. Next, at step S22, the control section 114 determines the number of the switches to be turned on and off among the switches $SW_1$ to $SW_n$ on the basis of the direct-current voltage having been measured at step S21.

Next, at step S23, the control section 114 controls the load modulation section 112A on the basis of the above determination. More specifically, the control section 114 controls the number of the switches to be turned off among the switches $SW_1$ to $SW_n$ such that the smaller the direct-current induced voltage having been measured at step S21 is, the larger the load (the combined resistance) of the load modulation section 112A is made.

[Effects]

In the cartridge memory 11 according to the first embodiment, the control section 114 measures the induced voltage having been induced on the antenna coil 111 and controls the load modulation section 112A on the basis of the measured induced voltage, thus making it possible to change the load (internal resistance) of the load modulation section 112A and to thereby ensure electric power needed to drive the cartridge memory 11.

Further, the number of the switches to be turned on and off among the switches $SW_1$ to $SW_n$ is controlled to change the load (the combined resistance) of the load modulation section 112A, thereby making it possible to shift a distance at which the null point occurs. Thus, unavailability of the communication due to the null point or a decrease of the intensity of the communication due to the null point can be prevented. In addition, the null point is likely to occur because of a combination with a specific recording and reproducing apparatus 20 (specifically, a specific reader/writer 21), manufacturing variation of the cartridge 10, changes of usage environments (noise, temperature, etc.) and so on.

Thus, the communication with the recording and reproducing apparatus 20 can be stabilized.

In the case of a storage medium, the cartridge 10 is typically used in a plurality of drives, and further, the cartridge 10 is sometimes detached and used at a completely different place. Thus, making it possible to prevent defects due to the null point in such a manner as described above can facilitate the use of the cartridge 10 to a greater extent.

Shapes and layout positions of antennas of the drives or the like differ for each of manufacturers; however, even though the differences of those exist, stable communication with the drive or the like can be made. That is, regardless of the differences of the manufacturers of the drives or the like, stable communication with the drive or the like can be made. Further, because of the manufacturing variation of the cartridge memory 11 itself, a drive voltage may change; however, even in the case in which such a variation exists, stable communication with the drive or the like can be made.

With the recent growth of the record density of the magnetic tape, preserved track information is increased, and the capacity of the cartridge memory also tends to be increased. For this reason, even in high-speed communication, the cartridge memory is desired to be capable of stably communicating with the drive or the like. For the cartridge memory 11 according to the first embodiment, as described above, the control section 114 controls the load modulation section 112A on the basis of the induced voltage, and thus, the stable communication can be made even in such high-speed communication. Further, even in a case in which a temperature/humidity environment changes, and even in a case in which noise occurs due to driving of the motor in the recording and reproducing apparatus 20, or the like, the stable communication can be made. Thus, the stable communication with the recording and reproducing apparatus 20 can be achieved, and soundness of data is ensured.

Modification Examples

In the aforementioned first embodiment, a case in which the recording and reproducing apparatus is the magnetic tape drive has been described. Alternatively, the recording and reproducing apparatus may be a magnetic tape autoloader or a magnetic tape library apparatus.

In the aforementioned first embodiment, a case in which the recording and reproducing system is the magnetic tape recording and reproducing system has been described, and additionally, the recording and reproducing system may be an optical disk recording and reproducing system. That is, the cartridge memory and the recording and reproducing apparatus may be an optical disk cartridge and an optical disk recording and reproducing apparatus, respectively.

The control section 114 may retain an initially controlled magnitude of the load until the unloading of the cartridge 10 from the recording and reproducing apparatus 20 after the loading of the cartridge 10 into the recording and reproducing apparatus 20. Specifically, the control section 114 may store the number of initial, turned on-and-off switches among the switches $SW_1$ to $SW_n$ (namely, the initially controlled magnitude of the load) into the memory 113 after the loading of the cartridge 10 into the recording and reproducing apparatus 20, and control the load modulation section 112A on the basis of the number of the initial, turned on-and-off switches among the switches $SW_1$ to $SW_n$, the number being stored in the memory 113, until the unloading of the cartridge 10 from the recording and reproducing apparatus 20.

In this case, after an induced voltage-based magnitude of the load (namely, the induced voltage-based number of the initial, turned on-and-off switches among the switches $SW_1$ to $SW_n$) is initially calculated, a process of calculating the magnitude of the load is not required to be performed again. Thus, processing in the cartridge memory 11 can be simplified.

The control section 114 may repeatedly measure the induced voltage at predetermined time intervals and control the load modulation section 112A every time the induced voltage is measured. More specifically, the control section 114 may control the on/off of each of the switches $SW_1$ to $SW_n$ every time the induced voltage is measured.

In this case, even though communication environment changes due to temperature, noise, etc. exist, the magnitude of the load of the load modulation section 112A can be appropriately adjusted. Thus, further stable communication can be made with the recording and reproducing apparatus 20.

2. Second Embodiment

[Configuration of Cartridge Memory]

Figure 7:
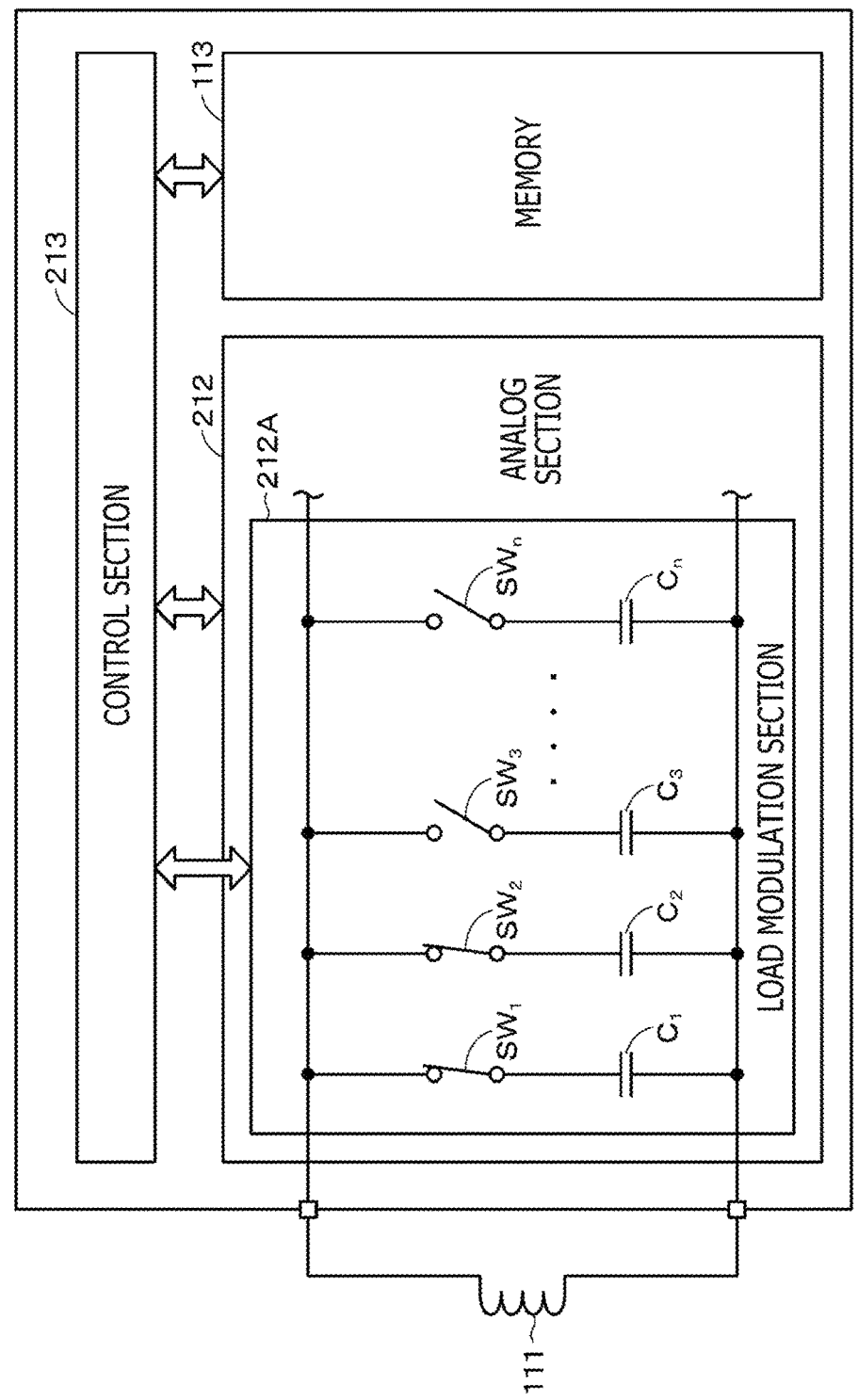
FIG. 7 is a block diagram illustrating an example of a configuration of a cartridge memory according to a second embodiment of the present disclosure.

FIG. 7 illustrates an example of a configuration of a cartridge memory 211 according to this second embodiment of the present disclosure. The cartridge memory 211 is different from the cartridge memory 11 according to the first embodiment in that the cartridge memory 211 includes an analog section 212 that includes a load modulation section 212A, implementing capacitance as its load, for performing capacitance load modulation on transmitting signals, and a control section 213 for measuring the induced voltage and controlling the load modulation section 212A on the basis of the measured induced voltage. Note that, in this second embodiment, portions similar to certain portions of the first embodiment are denoted by the same signs as those of the certain portions, and the descriptions of the portions are omitted.

The load modulation section 212A includes a capacitance variable section whose capacitance is variable. More specifically, the load modulation section 212A includes a plurality of capacitors $C_1$ to $C_n$ connected in parallel, and a plurality of switches $SW_1$ to $SW_n$ each connected in series with a corresponding one of the plurality of capacitors $C_1$ to $C_n$. A resonance frequency of the cartridge memory 211 can be adjusted by means of the number of turned on-and-off switches among the switches $SW_1$ to $SW_n$. The control section 213 controls the on/off of each of the switches $SW_1$ to $SW_n$ to correct an amount of a shift of the resonance frequency such that an induced voltage (namely, a direct-current induced voltage having been converted by the rectification circuit) higher than or equal to a predetermined value can be obtained.

Effects

For the cartridge memory 211 according to the second embodiment, adjusting the resonance frequency makes it possible to obtain a high induced voltage. Thus, S/N can be improved, and the intensity of the communication can be ensured. Further, the manufacturing variation of the cartridge memory 11 itself may change its frequency characteristic; however, even in the case in which such a variation exists, stable communication can be made.

Heretofore, the first and second embodiments and modification examples according to the present disclosure have been specifically described; however, the present disclosure is not limited to the foregoing first and second embodiments and modification examples, and various modifications based on the technical thought of the present disclosure can be made.

For example, configurations, methods, processes, shapes, materials, numerical values, and any other features that have been cited in the foregoing first and second embodiments and modification examples are just examples, and a configuration, a method, a process, a shape, a material, a numerical value, and any other features that are each different from a corresponding one of the above features may be used as necessary.

Further, the configurations, the methods, the processes, the shapes, the materials, the numerical values, and any other features of the foregoing first and second embodiments and modification examples can be combined with one another unless the combinations depart from the gist of the present disclosure.

Further, the present disclosure can also employ the following configurations.

(1)

A cartridge memory used in a recording medium cartridge, the cartridge memory including:

an antenna section that induces an induced voltage by means of electromagnetic induction;

a load modulation section including a load whose magnitude is variable; and a control section that measures the induced voltage and controls the load modulation section on the basis of the measured induced voltage.

(2)

The cartridge memory according to (1), in which the load modulation section includes a resistance variable section whose resistance is variable.

(3)

The cartridge memory according to (2), in which the smaller the induced voltage is, the larger the control section makes the resistance.

(4)

The cartridge memory according to (1), in which the load modulation section includes a capacitance variable section whose capacitance is variable.

(5)

The cartridge memory according to (4), in which in a case in which the induced voltage is smaller than a predetermined value, the control section controls the load modulation section to correct an amount of a shift of a resonance frequency.

(6)

The cartridge memory according to any one of (1) to (5), in which the control section retains a magnitude of an initially controlled load until the recording medium cartridge is unloaded after having been loaded.

(7)

The cartridge memory according to any one of (1) to (5), in which the control section repeatedly measures the induced voltage and controls the load modulation section every time the induced voltage is measured.

(8)

The cartridge memory according to any one of (1) to (7), in which the recording medium cartridge includes a magnetic tape cartridge.

(9)

A recording medium cartridge including:

the cartridge memory according to any one of (1) to (8).

(10)

A recording and reproducing system including:

a recording medium cartridge including the cartridge memory according to any one of (1) to (8); and a recording and reproducing apparatus that performs recording and reproducing into and from the recording medium cartridge.

(11)

The recording and reproducing system according to (10), in which the recording and reproducing apparatus includes a drive, an autoloader, or a library apparatus.

(12)

A control method for a cartridge memory used in a recording medium cartridge, the control method including:

measuring an induced voltage induced on an antenna coil; and controlling load modulation on the basis of the measured induced voltage.

REFERENCE SIGNS LIST

10 Cartridge
11 Cartridge memory
12 Cartridge case
12A Lower shell 12A
12B Upper shell 12B
12C Drawing port
13 Reel
13A Reel hub
13B Flange
14 Reel lock
15 Reel spring
16 Spider
17 Slide door
18 Door spring
19 Write protect
20 Recording and reproducing apparatus
21 Reader/writer
22 Recording and reproducing section
23 System controller
24 Interface
31 Base body
32 Underlayer
33 Magnetic layer
34 Back coat layer
100 Recording and reproducing system
200 External computer
111 Antenna coil
112 Analog section
112A Load circuit
113 Memory
114 Control section
MT Magnetic tape
$C_1$ to $C_n$ Capacitor
$R_1$ to $R_n$ Resistor
$SW_1$ to $SW_n$ Switch

The invention claimed is:

1. A cartridge memory used in a recording medium cartridge, the cartridge memory comprising:

an antenna section that induces an induced voltage by means of electromagnetic induction;

a load modulation section including a load whose magnitude is variable; and a control section that measures the induced voltage and controls the load modulation section on a basis of the measured induced voltage, wherein the load modulation section includes a plurality of switches connected in parallel and a plurality of capacitors connected in parallel, and the switches each are connected in series with a corresponding one of the capacitors, and wherein a resonance frequency of the cartridge memory is adjusted by the control section to keep the induced voltage higher than or equal to a predetermined value.

2. The cartridge memory according to claim 1, wherein a capacitance value of the load modulation section variable.

3. The cartridge memory according to claim 1, wherein the control section retains a magnitude of an initially controlled load until the recording medium cartridge is unloaded after having been loaded.

4. The cartridge memory according to claim 1, wherein the control section repeatedly measures the induced voltage and controls the load modulation section every time the induced voltage is measured.

5. The cartridge memory according to claim 1, wherein the recording medium cartridge includes a magnetic tape cartridge.

6. A recording medium cartridge comprising:

a magnetic tape, and a cartridge memory, wherein the cartridge memory including:

an antenna section that induces an induced voltage by means of electromagnetic induction;

a load modulation section including a load whose magnitude is variable; and a control section that measures the induced voltage and controls the load modulation section on a basis of the measured induced voltage, wherein the load modulation section includes a plurality of switches connected in parallel and a plurality of capacitors connected in parallel, and the switches each are connected in series with a corresponding one of the capacitors, and wherein a resonance frequency of the cartridge memory is adjusted by the control section when the induced voltage is lower than a predetermined value.

7. A recording and reproducing system comprising:

a recording medium cartridge including a cartridge memory; and a recording and reproducing apparatus that performs recording and reproducing into and from the recording medium cartridge, wherein the cartridge memory including:

an antenna section that induces an induced voltage by means of electromagnetic induction;

a load modulation section including a load whose magnitude is variable; and a control section that measures the induced voltage and controls the load modulation section on a basis of the measured induced voltage, wherein the load modulation section includes a plurality of switches connected in parallel and a plurality of capacitors connected in parallel, and the switches each are connected in series with a corresponding one of the capacitors, and wherein a resonance frequency of the cartridge memory is adjusted by the control section when the induced voltage is lower than a predetermined value.

8. The recording and reproducing system according to claim 7, wherein the recording and reproducing apparatus includes a drive, an autoloader, or a library apparatus.

* * * * *